United States Patent [19]

Burgermann

[11] 4,106,865
[45] Aug. 15, 1978

[54] MOTION-PICTURE CAMERA PROGRAMMED FOR FADEOVER EFFECTS

[75] Inventor: Norbert Burgermann, Munich, Fed. Rep. of Germany

[73] Assignee: AGFA-Gevaert, A.G., Leverkusen, Fed. Rep. of Germany

[21] Appl. No.: 829,816

[22] Filed: Sep. 1, 1977

[30] Foreign Application Priority Data

Sep. 8, 1976 [DE] Fed. Rep. of Germany ....... 2640466

[51] Int. Cl.$^2$ ............................................ G03B 21/36
[52] U.S. Cl. ................. 352/91 C; 352/91 S; 352/141; 354/23 D
[58] Field of Search ..................... 352/91 C, 91 S, 141; 354/23 D

[56] References Cited

U.S. PATENT DOCUMENTS 4,006,975 2/1977 Wagensonner et al. ........... 352/91 C

*Primary Examiner*—Russell E. Adams
*Attorney, Agent, or Firm*—Michael J. Striker

[57] ABSTRACT

The light-sensitive negative-feedback diaphragm control system of the motion-picture camera includes a stepper-motor coupled to the diaphragm, and a control circuit generating stepper-motor drive pulses. The control circuit includes an oscillator having a time-constant circuit which establishes the repetition frequency of the drive pulses. $m$ different repetition frequencies can be established for the drive pulses, using $m$ semiconductor switches each connected to the time-constant circuit. A program-step counter counts program-step-change signals generated during film transport, and a "1" signal appears on successive ones of the counter outputs. The outputs include, in succession, a fade-out output group, a rewind output group, and a fade-in output group. Each such output group contains $m$ outputs. Logic circuitry connected to the outputs of the program-step counter imbalances the diaphragm control system and controls the film transport motor, to effect fade-out, then rewind, then fade-in in dependence upon the program-step count. The first through $m$th semiconductor switches are each connected to the first through $m$th outputs of the fade-out output group, respectively, and to the $m$th through first outputs of the fade-in output group, respectively. Accordingly, during fade-out, the repetition frequency of the drive pulses is progressively increased, and during fade-in decreased.

10 Claims, 2 Drawing Figures

MOTION-PICTURE CAMERA PROGRAMMED FOR FADEOVER EFFECTS

BACKGROUND OF THE INVENTION

The invention relates to a motion-picture camera provided with a light-sensitive negative-feedback diaphragm control system, of the type including a stepper motor which adjusts the diaphragm and is driven by a control circuit which generates stepper-motor drive pulses in dependence upon the imbalance of the diaphragm control system. In motion-picture cameras of this type, fadeover effects are produced by deliberately imbalancing the diaphragm control system, to produce an aperture decrease for fadeout, and after the intermediate film rewind, a corresponding aperture increase for the subsequent fade-in. It is desired that the amount by which the aperture is changed for the fade-out and the fade-in be always the same, i.e., irrespective of the number of film frames which the photographer selects for involvement in the fadeover.

It is also desired that, during the fade-out, the speed of operation of the stepper motor progressively increase and then, during the subsequent fade-in, progressively decrease in a corresponding manner.

Most preferably, it is desired that the frequency of the oscillator producing the stepper-motor drive pulses be varied, by means of its time-constant circuit, in such a way that, at the start of the fade-out, the frequency drops from its normal-filming value down to a lower limit value, then during the fade-out progressively increases to an upper limit value higher than that for normal filming, then during the subsequent fade-in progressively decreases from the upper limit value back down to the lower limit value, and then at the end of the fade-out returns to its normal-filming value.

SUMMARY OF THE INVENTION

It is a general object of the invention to provide a system having capabilities such as described above, implemented using electronic means.

It is a more specific object to assure that, if the scene-light level remains constant during the fadeover operation, the composite exposure of each film frame involved in the fadeover and exposed both during fade-out and fade-in will be such that none of these frames will be over- or underexposed. If the scene-light level does change during the fadeover operation, this should have at most a negligible effect upon the under-/overexposure problem just mentioned. Furthermore, the progressive change of the speed at which the stepper motor adjusts the diaphragm during the fade-out and fade-in should be implemented in a program-controlled manner, using simple electronic means.

These objects, and others which will become more understandable from the description of an exemplary embodiment, can be achieved by utilizing a program-step counter which receives program-step-change signals in dependance upon film transport. The counter is a 1-out-of-$n$ counter; i.e., in response to successive program-step-change signals, the output signal of the counter shifts along successive ones of its outputs. The $n$ outputs of the counter include three output groups, each containing $m$ outputs. The first is a fade-out output group, the second a rewind output group, the third a fade-in output group. Logic circuitry connected to the outputs of the program-step counter implements the operations required for fade-out, rewind, and fade-in.

The diaphragm is adjusted by means of a stepper motor which receives stepper-motor drive pulses from an oscillator. The time-constant circuit of the oscillator has connected to it $m$ semiconductor switches, whose conduction states are controllable to establish $m$ different repetition frequencies for the stepper-motor drive pulses. The first through the $m$th semiconductor switches are each connected to a respective one of the first through the $m$th outputs of the fade-out output group, and are each connected to a respective one of the $m$th through the first outputs of the fade-in output group. For example, if $m$ equals 3, the first semiconductor switch (associated with the lowest of the three frequencies) is connected to the first output of the fade-out output group and to the third output of the fade-in output group; the second switch (associated with the middle one of the three frequencies) is connected to the second output of the fade-out output group and to the second output of the fade-in output group; the third switch (associated with the highest of the three frequencies) is connected to the third output of the fade-out output group and to the first output of the fade-in output group.

Preferably, the control electrode of each semiconductor switch is connected to one output of the fade-out output group and one output of the fade-in output group through the intermediary of an OR-gate.

The use of a 1-out-of-$n$ (step-by-step) program-step counter has the advantage that a progressive and orderly fadeover program can be established. Logic gates connected between the appropriate outputs of the program-step counter and the film transport motor and the diaphragm control system can implement the rather numerous operations needed for a complete fadeover operation in a very well-defined and orderly way. For example, the individual operations to be implemented may be dependent not only upon which individual output of the program-step counter carries a signal, but upon more complicated criteria as well, e.g., whether any of the outputs of the fade-out or fade-in output groups carry a signal irrespective of which output in particular carries the signal, whether the first output of the fade-in output group or the last output of the fade-out output group carries a signal irrespective of which of these two outputs is the one actually carrying the signal, and so forth.

Likewise, what would ordinarily be considered the main phases of a fadeover (the fade-out, the rewind, the fade-in) can be broken down into subphases, by association with plural successive counter outputs, making it possible to achieve control of the character of the course of each main phase, e.g., the progressive frequency increase during the fade-out phase and the progressive frequency decrease during the fade-in phase, discussed above, with very great precision and predetermination.

Advantageously, the $m$ semiconductor switches are used to establish the $m$ different repetition frequencies, with the cooperation of $m$ different resistors. Each switch is connected in series with one of the resistors across one of the resistors of the time-constant circuit of the oscillator. The $m$ resistors are preferably of lower resistance than the resistor of the time-constant circuit.

According to a particularly advantageous concept, the progressive change in the repetition frequency during the fade-out and the fade-in should be available not merely for one invariable fadeover length, but for any fadeover length which the photographer selects, i.e., no matter what number of film frames the photographer selects for involvement in the fadeover. If the photographer selects a different fadeover length, then the total extent to which the diaphragm aperture is changed during the fade-out phase (and likewise during the fade-in phase) should continue to be the same. Accordingly, the (average) speed of operation of the diaphragm-adjusting motor must vary inversely to the number of film frames which the photographer selects for involvement in the fadeover. If this is to be achieved, the $m$ different frequencies successively established during the fade-out and during the fade-in cannot in general be constant; rather, it is the relationship among the values of these $m$ frequencies which should be maintained constant, i.e., so that the course of the fadeover will always have the same character irrespective of the length of the fadeover. This rather difficult requirement can be met, according to an important concept of the invention, using an electronic switch connected in the current path of the time-constant circuit of the control oscillator for the stepper-motor. The oscillator is preferably an astable multivibrator, and its time-constant circuit may for example be an RC circuit operative for establishing the ON-state or OFF-state time-constant of the multivibrator; the energy-storing element of the time-constant circuit may for example be a capacitor, in which event the just-mentioned electronic switch would be connected in the charging- or discharging-current path of the capacitor, depending upon whether the time-constant is a charging time-constant or a discharging time-constant. More importantly, the electronic switch is rendered conductive and non-conductive alternately, to thereby change the effective value of the time-constant of the time-constant circuit, in dependence upon the ON/OFF control of the electronic switch, to automatically vary the frequency of the multivibrator in inverse proprotion to the number of film frames selected by the photographer for involvement in the fadeover. Thus, the $m$ different frequencies utilized for fade-out and for fade-in will always stand in the same relation to one another, but individually their values will vary in inverse relationship to the number of frames selected for involvement in the fadeover.

This somewhat complicated relationship between the repetition frequency of the stepper-motor drive pulses and the fadeover length can be achieved by registration of a reference pulse packet containing a number of pulses proprotional to the selected fadeover length, and then effecting the ON/OFF control of the electronic switch in the current path of the time-constant circuit in dependence upon the reference pulse packet. A pulse generator furnishes a pulse train to the input of a gating circuit having a selectable throughpass time interval. The photographer indirectly selects the fadeover length, by selecting the throughpass time interval, thereby producing at the output of the gating circuit a reference pulse packet containing a number of pulses proportional to the desired fadeover length. This occurs at the start of a fadeover program. First and second counters are used, the first to count film-frame pulses, the second to register the reference pulse packet. At the start of the fadeover program, the second counter receives the pulses of the reference pulse packet and registers their number for the entire duration of the fadeover program. The first counter starts to count frame pulses during film transport, and when its count reaches that on the second counter, a program-step-change signal is applied to the program-step counter, and the first counter is reset and performs another such counting cycle, at the end of which another program-step-change signal is applied to the program-step counter, and so forth. As the program-step counter is advanced, the necessary fadeover operations (forward film transport, termination of film transport, film rewind, termination of fim rewind, resumption of film transport, imbalancing of the diaphragm control system for fade-out and fade-in, etc.) are performed, controlled by logic gates capable of evaluating the count on the program-step counter. The automatic progression from one to the next of the aforementioned $m$ frequencies (in ascending or descending order) is thus performed in dependence upon the state of the program-step counter, and therefore also in dependence upon the operation of the first (frame-pulse) counter.

Preferably, a third counter is used, to properly perform the ON/OFF control of the electronic switch in the current path of the time-constant circuit of the stepper-motor control oscillator, so that the $m$ frequencies mentioned above individually vary in inverse relation to the number of pulses in the reference pulse packet registered by the second (reference) counter. During the course of the fadeover program, the third counter receives pulses from the aforementioned pulse generator (the one connected to the input of the aforementioned gating circuit and used to create the reference pulse packet). When the count on the third counter reaches that on the reference counter, a switch-control signal is generated, to change the conduction state of the electronic switch in the current path of the time-constant circuit of the stepper-motor control oscillator. Thereafter, the third counter becomes reset and performs another such counting cycle, resulting in the generation of another such switch-control signal, and so forth. Thus, the ON/OFF control of the electronic switch in the current path of the time-constant circuit is performed in dependence upon the number of pulses in the pulse packet registered by the reference counter.

An important advantage of the reference counter is that it registers, for the entire duration of the fadeover program, a number proportional to the photographer's initial selection for the fadeover length. During the course of the fadeover program, it is the reference counter which governs, not the photographer-operated selecting means. Thus, if the photographer inadvertently operates the selecting means during the course of the fadeover program, this has no effect upon the program; likewise, during the course of a fadeover program, for example between the rewind and fade-in phases when the camera is waiting for the filming of the scene to be faded-in, the photographer can if he wishes already preselect the fadeover length which he will want for his next fade-out, fade-in or fadeover.

In a preferred embodiment, the fade-out group of the program-step counter is preceded by a program-unstarted output which carries a signal when a fadeover program has not been initiated, and a waiting-step output is provided intermediate the rewind output group and the fade-in output group and carries a signal subsequent to the rewind phase when the camera is waiting for the photographer to film the next scene, the scene to be faded-in. Logic gates responsive to the disappearance of the signal from the program-unstarted output unblock the transmission path from the frame-pulse switch of the camera to the input of the first (frame-pulse) counter and unblock the control line from the output of the third counter to the control input of the electronic switch in the current path of the time-constant circuit. OR-gate circuitry is connected to the outputs of the fade-out and fade-in output groups, for connecting the film transport motor for forward film transport, and is also connected to the waiting-step output. Further OR-gate circuitry is connected to the outputs of the fade-out and rewind output groups and also to the waiting-step output, and its output controls the imbalancing of the diaphragm control system, i.e., to effect the requisite aperture decrease during the fade-out phase and hold the aperture decreased during the subsequent rewind phase and the waiting step of the fadeover program, until the fade-in phase commences.

According to a preferred concept, the pulse generator furnishing a pulse train to the input of the gating circuit, for the production of the reference pulse packet at the output of the gating circuit, is a first pulse generator. A second pulse generator is used to enable the gating circuit. The photographer, in selecting the number of pulses in the reference pulse packet, does so by selecting the ON/OFF ratio of the second pulse generator. The frequency of the second pulse generator should be smaller than that of the first pulse generator by a factor equal to at least the maximum number of pulses which the second (reference) counter can register. Preferably, all three counters (the frame-pulse counter, the reference counter, and the switch-control counter) are identical with respect to counting capacity.

To initiate the fadeover program, the photographer activates a fadeover switch. The resultant signal is registered as a "fadeover" command by a bistable storage device, throughout the entire fadeover program. When the bistable storage device is registering a "fadeover" command, it enables a gate in the transmission path from the frame-pulse switch to the first (frame-pulse) counter. A further gate connected between the frame-pulse switch and the input of the program-step counter becomes enabled when the second (reference) counter begins to register a reference pulse packet, and the first frame pulse transmitted through this gate causes the first input pulse to be applied to the program-step counter, i.e., so that its output signal shifts from its program-unstarted output to its next output. This second gate, through the intermediary of further gates, is connected to one input of a second bistable storage device, whose other input is connected to receive pulses from the second pulse generator, with the clock input of this second bistable storage device being connected to receive pulses from the first pulse generator. The output of this second bistable storage device is connected to one input of an AND-gate, whose other input is connected to the output of the second pulse generator, and whose output is connected to an enablement input of the second (reference) counter. This assures that, after the first transmitted frame pulse, the second (reference) counter will not begin to be enabled for counting except in between the gating pulses supplied by the second pulse generator, not in the middle of a gating pulse from the second pulse generator. This assures that the reference counter will, at the start of the program, always register a complete reference pulse packet, and can never register only part of a reference pulse packet.

According to a further concept, the frequency of the ON/OFF control of the electronic switch in the time-constant circuit of the stepper motor oscillator is equal to the repetition frequency of the second pulse generator.

Advantageously, the gate connected in the transmission line between the frame-pulse switch and the first counter has its output connected to the input of the program-step counter, for applying the first program-step-change signal thereto, i.e., prior to couting by the frame-pulse counter, and an inverter is connected to the program-unstarted output of the program-step counter, to furnish a program-in-process signal to one input of a NOR-gate, whose other input is connected to receive a signal from the fadeover switch, and whose output is connected to the reset input of the program-step counter.

Preferably, outputs of the first and second counters are connected to the inputs of a comparator comprised of a NOR-gate at whose output the program-step-change signals are furnished and transmitted to the input of the program-step counter via an OR-gate. The OR-gate has a further input connected to the output of a differentiator, whose input is connected to the output of a NAND-gate having two inputs, of which one receives frame pulses and the other a signal indicating whether the second counter has counted or not.

Preferably, the electronic switch connected in the current path of the timing-circuit of the stepper-motor control oscillator is a transistor. Its base is connected to the output of an AND-gate. One input of the AND-gate receives the program-in-process signal, and the other input receives the output signal from a comparator which compares the counts on the second and third counters, thereby enabling ON/OFF control of the transistor when a fadeover program has started.

Preferably, the reset input of the third counter is connected to the output of a gate, one input of which receives the program-in-process signal, the other input of which is connected to the output of the second pulse generator through a differentiator stage, to reset the third counter for performance of its next counting cycle as soon as the next positive-going flank of a pulse from the second pulse generator appears. Preferably the comparator which compares the counts on the second and third counters has its output connected to the control input of the third counter, to arrest the third counter as soon as the counts on the second and third counters become equal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
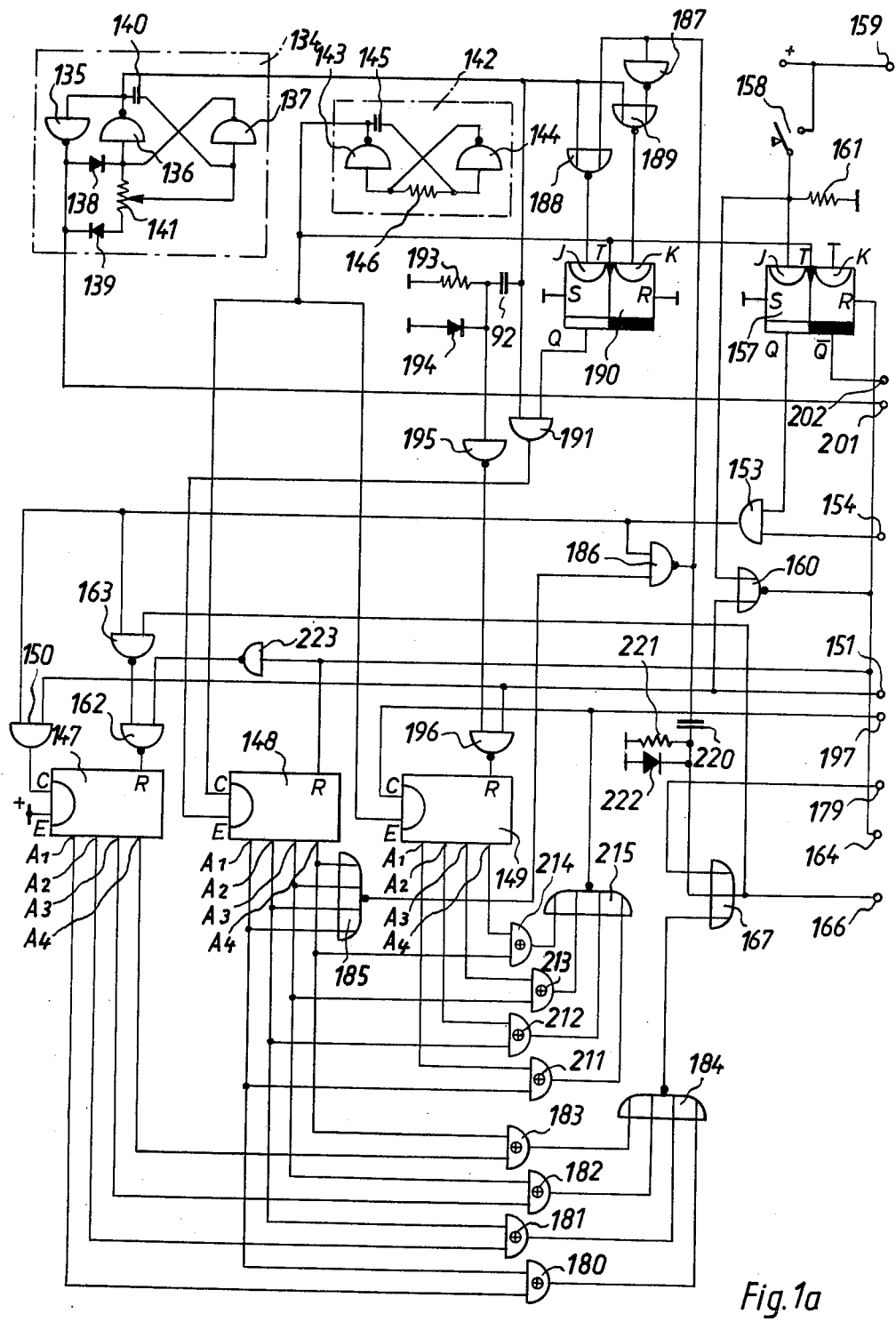
FIGS. 1a and 1b form the left and right halves of a single circuit diagram, illustrating an exemplary embodiment of the invention.
Figure 1B:
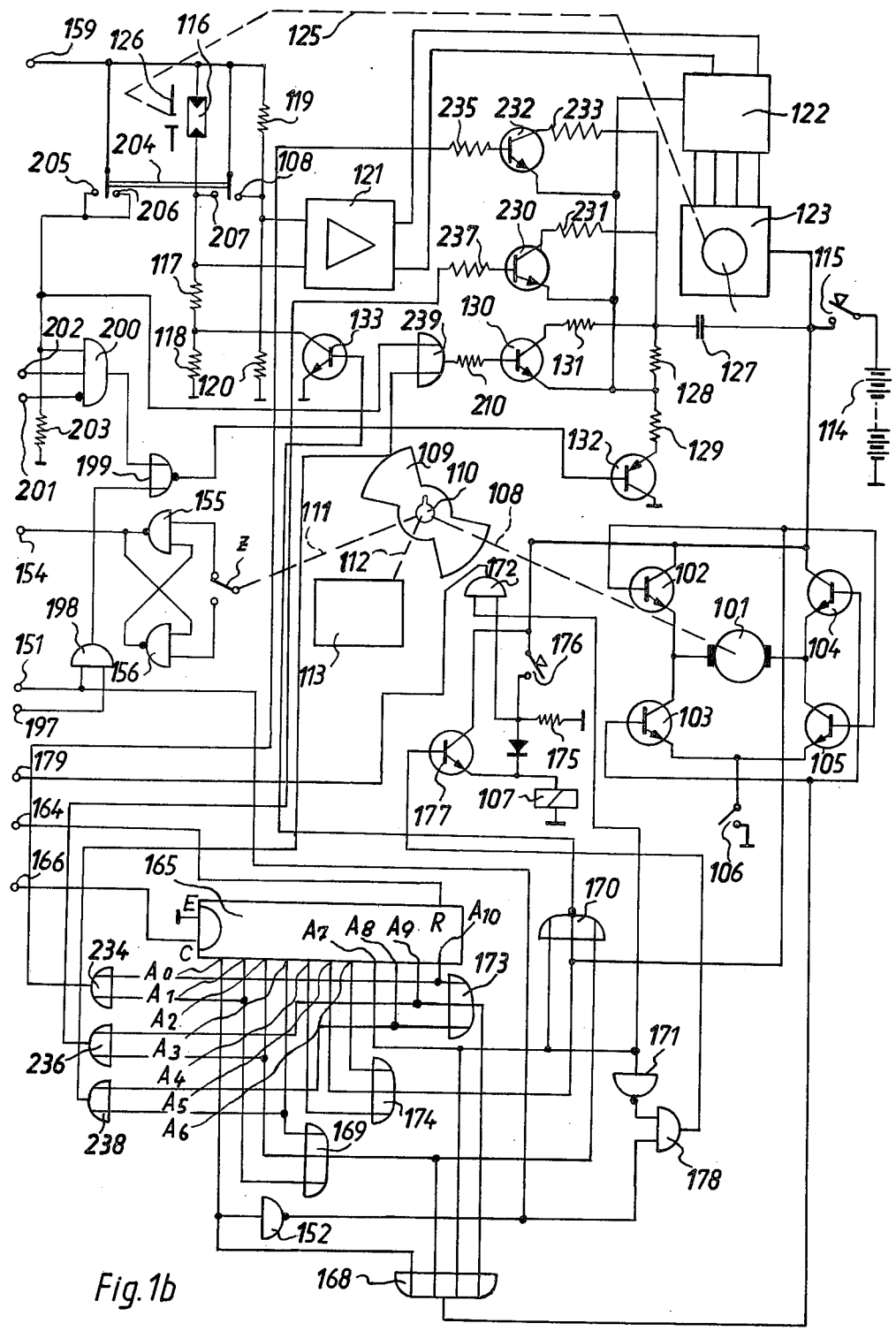

FIGS. 1a and 1b together depict the circuit diagram of an exemplary embodiment.

As shown in FIG. 1b, a film drive motor 101 is connected in the diagonal of a bridge circuit whose branches contain respective transistors 102, 103, 104, 105. The bases of transistors 102, 105 are connected in common; the bases of transistors 103, 104 are connected in common. Transistors 103 and 104 are conductive for forward motor operation; transistors 102 and 105 are conductive for reverse motor operation. Connected in the common emitter branch of transistors 102–105 is the contact 106 of a relay 107. A mechanical coupling 108 couples the motor 101 to a rotary shutter 109 whose rotary pin is denoted by 110. A mechanical coupling 111 extends from a projection on rotary pin 110 to a frame-pulse contact 102. A mechanical coupling 112 couples the rotary pin 110 to a (schematically depicted) film transport mechanism 113. The camera battery is denoted by 114. The battery 114 is connectable to the illustrated circuit by means of a battery-connect switch 115.

A negative-feedback diaphragm-control system includes a light-sensitive voltage divider comprised of a photoresistor 116, a resistor 117 and a fadeover resistor 118. A further voltage divider includes a resistor 119 and another resistor 120. The taps of these voltage dividers are connected to the inputs of a comparator amplifier 121, the two outputs of which are connected to a stepper motor control circuit 122. The stepper motor control circuit 122 has four outputs connected to four (non-illustrated) stator windings of a stepper motor 123, whose armature 124 is coupled via a mechanical coupling 125 to a diaphragm 126.

The stepper motor control circuit includes a (non-illustrated) internal oscillator, whose time-constant components are shown externally and constituted by a capacitor 127 and resistors 128 and 129. A transistor 130 when conductive connects a resistor 131 in parallel to resistor 128. Instead of having resistor 131 connected in parallel to resistor 128, a further transistor 230 when conductive connects a resistor 231 in parallel to resistor 128. Instead of having resistor 131 connected in parallel to resistor 128, a still further transistor 232 when conductive connects a resistor 233 in parallel to resistor 128. When none of transistors 131, 231, 233 are connected in parallel to resistor 128, then the frequency of the oscillator internal to stepper motor control circuit 122 is determined by time-constant elements 127–129; when one of transistors 130, 230, 232 is conductive, then the frequency of the oscillator is determined by elements 127–129 plus the one of the three resistors 131, 231, 233 associated with the conductive one of the three transistors. The resistance of resistor 128 is higher than the resistances of resistors 131, 231 and 233. The resistance of resistor 233 is greater than that of resistor 231. In turn, the resistance of resistor 231 is higher than that of resistor 131. Accordingly, if none of resistors 131, 231, 233 is connected in parallel to resistor 128, then the time constant of the oscillator producing the stepper-motor energizing pulses will be high, and accordingly the oscillator frequency low. This is referred to herein as the normal base frequency. If any of resistors 131, 231, 233 is connected in parallel to resistor 128, then oscillator will have one of three elevated base frequencies. In particular, if resistor 233 or 231 or 131 is switched in, then the drive frequency for the stepper motor will have a lower elevated base frequency or a middle elevated base frequency of an upper elevated base frequency, respectively. The three elevated base frequencies associated with the three resistors 233, 231, 131 are such that, on a frequency-versus-time graph representing a linear change in frequency with respect to time, each of these three frequencies will lie on the straight-line curve. A control transistor 132 is connected in the current path of the time-constant elements 127, 128 and 129.

Connected in parallel to the fadeover resistor 118 is a switching transistor 133.

A pulse generator 134 (FIG. 1a) comprises inverters 135, 136, 137, rectifiers 138, 139 and timing elements 140, 141, which latter establish the frequency or ON-/OFF ratio of the pulse train produced. Resistor 141 is adjustable by means of a non-illustrated adjusting device manually operable by the photographer. The duration of the pulses produced by pulse generator 134 (referred to hereinafter as the second pulse generator) is infinitely (i.e., steplessly) adjustable.

A further pulse generator 142 (referred to hereinafter as the first pulse generator) comprises two inverters 143, 144 and a timing stage 145, 146. The constant frequency of the pulse train furnished by pulse generator 142 is higher than the frequency of that furnished by second pulse generator 134. Numerals 147, 148, 149 denote three identical binary counters. These counters are so-called four-bit counters, whose outputs are denoted by A1, A2, A3, A4. Each counter 147, 148, 149 has a clock input C, a control input E and a reset input R. Each of the counters 147, 148, 149 can count 15 pulses, if one does not consider the 0000 states of these counters.

The control input E of first counter 147 is permanently connected to positive potential. The clock input C of first counter 147 is connected to the output of an AND-gate 150, whose one input is connected via connections 151 to the output of an inverter 152 and whose other input is connected to the output of an AND-gate 153. One input of AND-gate 153 is connected via connections 154 to the output of a pulse shaper 155, 156, the input of which is connected to the frame-pulse contact z. The other input of AND-gate 153 is connected to the output Q of a JK master-slave flip-flop 157. The J-input of JK flip-flop 157 is connected with a fadeover switch 158, via which the J-input through the intermediary of connections 159 is connectable to the positive terminal of battery 114. The K-input of JK flip-flop 157 is connected to ground. The same applies to the S-input. The R-input of JK flip-flop 157 is connected to the output of a NOR-gate 160, whose one input is connected via a resistor 161 to ground and via the fadeover switch 158 to the positive terminal of battery 114. The other input of NOR-gate 160 is connected via connections 151 to the output of inverter 152.

The output of NOR-gate 160 is additionally connected, via an inverter 223, with one input of a NAND-gate 162, whose output is connected to the R-input of counter 147; the other input of 162 is connected to the output of a NOR-gate 163. Additionally, the output of NOR-gate 160 is connected to the R-input of second counter 148 and, via connections 164, to the input R of a program-step counter 165, the latter being here a binary counter operating on a 1-out-of-11 basis (i.e., only one of its 11 outputs carries a "1" signal at any given time). The control input E of counter 165 is connected to ground, whereas its clock input C is connected via connections 166 with the output of an OR-gate 167. The eleven outputs of counter 165 are denoted by A0, A1, A2, A3, A4, A5, A6, A7, A8, A9, A10. The first output A0 is connected to the input of an inverter 152; also, first output A0 is connected to an input of an OR-gate 168.

Outputs A1 to A3 of program-step counter 165 are connected to the inputs of an OR-gate 169, whose output is connected to a further input of the OR-gate 168 and also connected to an input of a NOR-gate 170.

Output A7 of program-step counter 165 is connected to another input of OR-gate 168. Furthermore, a connecting line leads from output A7 of program-step counter 165 to another input of NOR-gate 170 and also to the input of an inverter 171. Output A7 of counter 65 is additionally connected to one input of an AND-gate 172. Outputs A8 to A10 of program-step counter 165 are connected to an OR-gate 173, whose output is connected to another input of OR-gate 168. Outputs A4, A5 and A6 of counter 165 are connected to the inputs of an OR-gate 174, whose output is connected to another input of NOR-gate 170.

Additionally, a line leads from the output of OR-gate 174 to the bases of the two transistors 102 and 105.

Also, a line leads from the output of OR-gate 168 to the bases of the two transistors 103 and 104.

Outputs A1 and A10 of program-step counter 165 are connected to the inputs of an OR-gate 234, whose output is connected via a resistor 235 to the base of transistor 232. Outputs A2 and A9 of program-step counter 165 are connected to the inputs of an OR-gate 236, whose output is connected via a resistor 237 to the base of transistor 230. Outputs A3 and A8 of program-step counter 165 are connected to the inputs of an OR-gate 238, whose output is connected to one input of an OR-gate 239, the output of which is connected via a resistor 210 to the base of transistor 130.

The input of AND-gate 172 normally connected to ground via a resistor 175 is connectable to the positive terminal of battery 114 by means of a release switch 176. A transistor 177 is connected in parallel to release switch 176. The base of transistor 177 is connected to the output of an AND-gate 178; one input of 178 is connected to the output of inverter 171, and the other input of 178 is connected to the output of inverter 152.

The output of AND-gate 172 is connected via connections 179 to one of the three inputs of OR-gate 167.

Outputs A1 to A4 of first counter 147 are connected to the first inputs of respective EXCLUSIVE-OR-gates 180, 181, 182, 183. The second inputs of these EXCLUSIVE-OR-gates are connected to the corresponding outputs A1 to A4 of second counter 148. The outputs of EXCLUSIVE-OR-gates 180–183 are connected to respective inputs of a NOR-gate 184, whose output is connected to another input of OR-gate 167.

The outputs A1–A4 of second counter 148 are also connected to the inputs of a NOR-gate 185, whose output is connected to one input of a NAND-gate 186. The other input of NAND-gate 186 is connected to the output of AND-gate 153.

The output of NAND-gate 186 is connected, via a first control line which includes a differentiator stage 220, 221, 222, to the third input of OR-gate 167. A further control line extends from the output of NAND-gate 186 to the input of an inverter 187 and also to one input of a NOR-gate 188. The output of inverter 187 is connected to one input of a NOR-gate 189. The other inputs of NOR-gates 188, 189 are connected in common to the output of the second pulse generator 134. The output of NOR-gate 188 is connected to the J-input of a second JK master-slave flip-flop 190, whose K-input is connected to the output of NOR-gate 189. The S and R inputs of JK flip-flop 190 are connected to ground. The output Q of the second JK flip-flop 190 is connected to one input of an AND-gate 191. The second input of AND-gate 191 is connected to the output of the second pulse generator 134. The output of AND-gate 191 is connected to the control input E of the second counter 148. The clock inputs T of the first and second JK master-slave flip-flop 157 and 190 are connected to the output of the first pulse generator 142.

A first control line extends from the output of the first pulse generator 142 to the clock input C of the second counter 148; a second control line extends from the output of pulse generator 142 to the control input E of third counter 149.

A further control line extends from the output of second pulse generator 134, via a differentiator stage 192, 193, 194, to the input of an inverter 195, whose output is connected to one input of a NAND-gate 196. The other input of NAND-gate 196 is connected via connections 151 to the output of inverter 152. The output of NAND-gate 196 is connected to the R-input of third counter 149.

Clock input C of third counter 149 is connected via connections 197 to one input of an AND-gate 198, whose other input is connected to the output of inverter stage 152. The output of AND-gate 198 is connected to one input of a NOR-gate 199, whose output is connected to the base of control transistor 132. The other input of NOR-gate 199 is connected to the output of an AND-gate 200, whose one input is connected via connections 201 to the output of the second pulse generator 134. Another input of AND-gate 200 is connected via connections 202 to the output Q of the first JK master-slave flip-flop 157. A third input of AND-gate 200 is connected via a resistor 203 to ground. This input is connectable via a fade-in/fade-out switch 204 to the positive terminal of battery 114. The contacts of the fade-in/fade-out switch 204 are denoted by 205, 206, 207, 208. The contacts 205 and 206 are connected to the upper input of the OR-gate 239.

The outputs A1–A4 of the second counter 148 are connected to the first inputs of respective EXCLUSIVE-OR-gates 211, 212, 213, 214. The second inputs of these EXCLUSIVE-OR-gates 211–214 are connected to the corresponding outputs A1–A4 of the third counter 149. The outputs of EXCLUSIVE-OR-gates 211–214 are connected to the inputs of a NOR-gate 215, whose output is connected via connections 197 to one input of AND-gate 198 and furthermore to the clock input C of third counter 149.

The operation of the illustrated circuit is as follows:

When the battery-connect switch 115 is closed, the circuit is ready for operation. The two pulse generators 134, 142 produce their pulse trains, with that of first generator 142 being of higher repetition frequency than that of generator 134. It is assumed, here, that these two repetition frequencies differ by a factor of 16, this factor being equal to the maximum count registerable by counter 148. Accordingly, during one period of pulse generator 134, a maximum of 16 pulses from generator 142 can be counted. The fadeover switch 158 is in its normal setting (open). Consequently, a "0" signal is applied to the upper input of gate 160. Program-step counter 165 likewise is in its normal setting, a "1" signal being present on its output A0. This "1" signal is applied via inverter 152 as a "0" signal to the second input of gate 160. Accordingly, there is present at the output of gate 160 a "1" signal, which blocks the JK flip-flop 157 and the counters 147, 148, 165 via their respective R-inputs. Therefore, there is present at the output Q of JK flip-flop 157 a "0" signal, which is applied to the upper input of gate 153. This prevents AND-gate 153 from transmitting frame pulses from frame-pulse switch z. The output of gate 186 carries a "1" signal, which via inverter 187 is applied as a "0" signal to the right input of gate 189. The K-input of second JK flip-flop 190 is clocked at the rate at which pulse generator 134 furnishes pulses. However, JK flip-flop 190 remains in its normal setting.

During normal filming, it is only release switch 176 which is closed. When release switch 176 is closed, relay 107 becomes energized and contact 6 closes. Transistors 103 and 104 become conductive, because their bases receive "1" potential via the OR-gate 168. Motor 101 operates in the forward transport direction. Frame counting, i.e., counting of the frame pulses from frame-pulse switch z, does not occur because AND-gate 153 is disabled.

If now a fade-in or a fade-out is to be performed, the fade-in/fade-out switch 204 is displaced in the appropriate direction. For both fade-in and fade-out, gate 200 becomes enabled. The output Q of JK flip-flop 157 carries a "1" signal, so that AND-gate 200 will produce an output "1" signal in synchronism with the clocking pulses from pulse generator 134, and this "1" signal is applied, in the form of a "0" signal transmitted by NOR-gate 199, to the base of transistor 132. When transistor 132 is non-conductive, the oscillator internal to control circuit 122 (its time-constant components 127, 128, 129, shown externally) cannot produce stepper-motor energizing pulses. When transistor 132 is conductive, the oscillator internal to control circuit 122 can generate stepper motor energizing pulses, at the frequency determined by its time-constant elements. Accordingly, when transistor 132 is rendered conductive and non-conductive at the pulse-repetition frequency of second pulse generator 134, the stepper motor energizing-pulse-generating oscillator internal to circuit 122 varies in frequency dependent on the ON/OFF control of 132. Accordingly, the average rate at which stepper motor control circuit 122 can furnish stepper-motor energizing pulses is determined by the base repetition frequency to which it is set (by its time-constant elements) multiplied by the pulse duty factor of the pulse train furnished by pulse generator 134. The pulse duty factor of this pulse train is its pulse duration multiplied by its pulse-repetition rate. Accordingly, if the pulse duty factor of the pulse train from generator 132, and therefore the pulse duty factor transistor 132, is e.g., 80% (transistor 132 conductive for 80% of its period and non-conductive for 20% of its period), then the average rate at which stepper motor control circuit 122 can furnish stepper-motor energizing pulses is equal to the frequency established for its internal oscillator, multiplied by 80%. I.e., the adjusting speed of motor 123 will be directly proportional to the pulse duty factor of pulse generator 134, manually selected by the photographer using potentiometer 141.

If potentiometer 141 of second pulse generator 134 were adjusted to a setting in which transistor 132 is maintained uninterruptedly conductive, then the internal oscillator of stepper motor control circuit 122 would be uninterruptedly operative, and the elevated base frequency of the internal oscillator (elevated because transistor 130 is conductive) would determine the average rate at which stepper-motor energizing pulses are applied; i.e., the adjustment speed of the stepper motor would be maximum. The diaphragm 126 is opened up (for fade-in) or closed down (for fade-out). In general, however, the setting of potentiometer 141 of second pulse generator 134 is such that the pulse duty factor of transistor 132 is less than 100%, so that the application of energizing pulses to the stepper motor 123 from the control circuit 122 is frequency-varied i.e., dependent on pulse-repetition frequency of pulse generator 134. Accordingly, the alternating conduction and non-conduction of transistor 132 causes a correspondingly slower fade-in or fade-out to be performed by diaphragm 126. Again, it is noted that the adjusting speed of stepper motor 123 is directly proportional to the pulse duty factor established by resistor 141 for second pulse generator 134. Because the JK flip-flop 157 is in its normal setting, counters 147, 149, 165 are not advanced during fade-in or during fade-out.

If a fadeover (a fade-out, followed by a limited film rewind, followed by a fade-in) is to be performed, the user of the camera closes not only the release switch 176 but also the fadeover switch 158. This switches the film-transport motor 101 for forward film transport. Additionally, the J-input of first JK flipflop 157 and the upper input of NOR-gate 160 receive "1" signals. At the output of gate 160, there appears a "0" signal which enables the flip-flop 157 and the counters 147, 148, 165 (i.e., by causing their R-inputs to now receive "0" signals). The J-input of storage flip-flop 157 is currently in receipt of a "1" signal; accordingly, upon generation of the next-following clock pulse from pulse generator 142, storage flip-flop 157 becomes set, as a result of which the signal at its output Q changes from "0" to "1". Information representing a fadeover command is now stored in the JK flip-flop 157.

The "1" signal at output Q of storage flip-flop 157 is applied to the upper input of AND-gate 153, whose lower input receives frame pulses generated by frame-pulse switch z. The frame pulses appear now at the output of gate 153 and are applied to the inputs of gates 186 and 150. Because counter 148 is not yet switched on, its outputs A1–A4 carry "0" signals. As a result, the signal at the output of gate 185 is a "1". This "1" signal is applied to gate 186. Gate 186 is accordingly enabled. Program counter 165 likewise is still in its normal setting, i.e., a "1" signal is present on its output A0. This "1" signal is applied via inverter 152 as "0" signals to gates 198, 150, 196. These gates are accordingly disabled. The frame pulses transmitted via gate 153 are further transmitted via gate 186. Because output A0 of program-step counter 165 carries a "1" signal and all its other outputs carry "0" signals, all of the transistors 130, 230 and 232 are non-conductive. Accordingly, the stepper-motor energizing pulse frequency will be determined by the time-constant resistors 128 and 129, the time-constant capacitor 127, and by the duty factor of transistor 132.

For the purpose of explanation, it is assumed that the ON-OFF ratio of the pulses from second pulse generator 134 (i.e., the ratio of the durations of its pulses to the durations of the interpulse intervals thereof) is adjusted by means of resistor 141 to a value such that the pulse duration (ON-time) of these pulses is fifteen times as long as the duration of one period of the pulse train furnished by first pulse generator 142 (i.e., 15 times as long as the sum of the ON- and OFF-times of the pulse train furnished by pulse generator 142).

After the storage flip-flop 157 registers a fadeover command (represented by a "1" signal at its output Q), the next frame pulse generated by frame-pulse switch z produces a "1" signal at the output of gate 153 and a "0" signal at the output of gate 186. The "0" signal from the output of gate 186, through the intermediary of inverter 187, disables gate 189. Additionally, gate 188 becomes enabled. The J-input of second storage flip-flop 190 does not receive a "1" signal until the value of the output from pulse generator 134 changes from "1" to "0". When this occurs, the next-following flank of the pulse from generator 142 causes storage flip-flop 190 to undergo a change of state, as a result of which a "1" signal appears at the Q output thereof and is applied to the input of gate 191. This "1" signal cannot yet be transmitted to the output of gate 191, because the output of pulse generator 134 is still at the "0" level. This start-up expedient prevents counter 148 from receiving (via gate 191) a pulse whose duration does not exactly correspond to the setting of potentiometer 141 of pulse generator 134.

Only after the potential at the output of second pulse generator 134 returns to the "1" level, does a "1" signal appear at the output of gate 191 and become applied to the control input E of the second counter 148.

Now, via its input C, second counter 148 begins to count up the pulses furnished by the first pulse generator 142; this continues for as long as there is a "1" signal at the output of second pulse generator 134 and of gate 191. The duration of this pulse from pulse generator 34 is established in advance by the setting of potentiometer 141, as already explained. According to the assumption specified above, second counter 148 counts up 15 pulses and stores that count.

As soon as the first such pulse has been counted by second counter 148, a "1" signal appears at the output of gate 185, causing gate 186 to become disabled. "1" signals are again applied to the inputs of gates 188 and 187; as a result, when the output signal of second pulse generator 134 changes from the "1" to the "0" level, storage flip-flop 190 becomes reset again, by a clock pulse from pulse generator 142. This circuit expedient assures that at the start of a fadeover there will be generated a single, well-defined pulse for enabling counter 148.

The change of the output signal of gate 186 from the "0" to the "1" level causes, via gate 167, the program-step counter 165 to advance by one count, i.e., the output A0 of counter 165 now carries a "0" signal, whereas its output A1 now carries a "1" signal. A "1" signal appears at the output of OR-gate 234, causing transistor 232 to become conductive and the resistor 233 to become connected in parallel to the resistor 128. This raises the frequency of the oscillator internal to steppermotor control circuit 122 from its normal base value to its first elevated base value; this first elevated base value is referred to here as the lower elevated base value, in contrast to the middle and upper elevated base values. Additionally, a "1" signal appears at the output of gate 169, causing a "0" signal to appear at the output of NOR-gate 170, and transistor 133 therefore becomes non-conductive. As a result, the light-sensitive bridge circuit 116–120 becomes imbalanced by an amount corresponding to the resistance of resistor 118. This imbalance of the light-sensitive bridge circuit causes steppermotor energizing pulses to be applied to the stepper motor, which thereupon stepwise adjusts the diaphragm for the first of the three phases of the fade-out operation. The "0" signal at output A0 is applied via inverter 152 as a "1" signal to the input of AND gate 150, enabling gate 150 for transmission of frame pulses. Additionally, gates 198 and 196 become enabled.

Now, the frame pulses generated by frame-pulse switch z are applied to the input C of first counter 147, counted up, and the count stored.

The aforementioned appearance of a "0" signal at the output A0 causes a "0" signal to appear at the output of gate 196. As a result, the third counter 149 is readied for operation. Accordingly, the third counter 149 counts the pulses generated by generator 142.

The gates 211–214 compare the signals on outputs A1–A4 of third counter 149 with the signals on outputs A1–A4 of second counter 148. After 15 pulses from pulse generator 142, all outputs A1–A4 of second counter 148 carry "1" signals. If fifteen pulses have been counted by third counter 149, then a "1" signal appears at the output of gate 215. As a result, via its input C, the third counter 49 becomes arrested. Furthermore, this "1" signal is transmitted via gate 198 to NOR-gate 199. As a result, transistor 132 becomes conductive, and stays conductive until counter 149 begins to perform its next counting cycle. This occurs only after the "0" to "1" transition of the next pulse from generator 134 causes a positive pulse, via differentiator 192, 193, 194, to become applied to the inverter 195, and therethrough applied as a "0" pulse to the gate 196. The R-input of third counter 149 receives a "1" signal, as a result of which third counter 149 becomes erased or reset. Shortly after the transmission of the positive pulse to the inverter 195, the input of inverter 195 is again in receipt of a "0" signal. Accordingly, the corresponding input of gate 196 receives a "1" signal and the R-input of counter 149 a "0" signal. As a result, counter 149 is enabled for another counting cycle. During the resetting of third counter 149, the output of gate 215 carries a "0" signal. As a result, a "0" signal is present at the output of gate 198. This in turn results in the application of a "1" signal to the base of transistor 132, and transistor 132 becomes non-conductive again. Transistor 132 stays non-conductive as counter 149 now performs another counting cycle, and then becomes conductive again at the end of this second counting cycle of counter 149, etc. In other words, when counter 149 is performing a counting cycle transistor 132 is non-conductive, and when transistor 149 is between counting cycles transistor 132 is conductive. Thus, during program step A1 (and for each program step in general) transistor is rendered conductive and non-conductive with a duty factor determined by the pulse duration to which pulse generator 134 was set at the moment when the user selected a fadeover operation. I.e., if the user should happen to change the setting of potentiometer 141, for example between the two scenes of a fadeover, this will have no effect, because the number of pulses in the pulse packet registered by reference counter 148 cannot be changed prior to completion of the entire fadeover operation.

Thus, if the user has set potentiometer 141 to a setting resulting in a short pulse duration for generator 134, a correspondingly small number of pulses will constitute the pulse packet registered by reference counter 148, and the duty factor of transistor 132 will be correspondingly long. If the user has set potentiometer 141 to a setting resulting in a longer pulse duration for generator 134, a correspondingly large number of pulses will constitute the pulse packet registered by reference counter 148, and the duty factor of transistor 132 will be correspondingly shorter. Irrespective of the number of film frames transported during the fade-out phase of the fadeover operation, the total extent to which stepper motor 123 will have changed the diaphragm setting during the fade-out phase will always be the same. The total extent to which the diaphragm setting has been changed can be expressed in the number of stepper motor energizing pulses, or in corresponding steps of diaphragm-setting change.

The program step A1 of counter 165 continues, as first counter 147 counts up frame pulses. When first counter 147 has counted 15 frame pulses, the "1" signals on its outputs correspond to the "1" signals on the outputs of the reference counter 148. Thus, a "1" signal appears at the output of gate 184. This is applied to the C input of program counter 165, and the "1" signal at the A1 of output of counter 165 converts to a "0" signal, and the "0" signal at the A2 output of counter 165 converts to a "1" signal; i.e., program step A2 of counter 165 has commenced. Additionally, via gates 132 and 162, a "1" signal is applied to the input R of the first (frame pulse) counter 147. As a result, counter 147 becomes erased and reset. As soon as the current frame pulse (i.e., the fifteenth) has ended, input R of counter 147 again receives a "0" signal, via gates 153, 163 and 162, so as to be readied for another frame-pulse counting cycle.

After counter 147 performs another frame-pulse counting cycle, another program-step-change signal is transmitted, via gates 184 and 167, to the program-step counter 165. The output "1" signal of counter 165 shifts from the A1 output to the A2 output; i.e., all other outputs carry "0" signals. Transistor 133 is kept non-conductive by gate 170. Furthermore, transistors 103 and 104 are biased for conduction by gate 168, and accordingly the motor 101 is connected for forward film transport. Additionally, a "0" signal is present at the output of OR-gate 234 and a "1" signal at the output of OR-gate 236. Consequently, transistor 232 is non-conductive and transistor 230 conductive. Thus, resistor 233 is now disconnected, and instead it is resistor 231 which is connected in parallel to resistor 128. As a result, the stepper-motor adjusting speed increases by a predetermined amount; in particular, the base frequency of the oscillator internal to control circuit 22 increases from the lower elevated value to the middle elevated value.

After frame-pulse counter 147 performs another counting cycle, the program-step counter 165 is advanced to its A3 state. Transistor 133 is maintained non-conductive by gate 170. Furthermore, the motor 101 continues to be connected for forward film transport, via transistors 103, 104. Additionally, a "0" signal is present at the output of OR-gate 236 and a "1" signal at the output of OR-gate 238. Consequently, a "1" signal is present at the output of OR-gate 239 and transistor 130 is conductive. Thus, resistor 231 is disconnected, and instead it is now resistor 131 which is connected in parallel to the resistor 128. As a result, the base value of the oscillator frequency increases from the middle elevated value (for the second phase of the fade-out) to the upper elevated value (for the third phase of the fade-out).

After frame-pulse counter 147 has performed another counting cycle, the program-step counter 165 is advanced from its A3 to its A4 state. As a result, transistors 103 and 104 are rendered non-conductive, via gate 168. Additionally, via gate 174, the two transistors 102 and 105 become biased for conduction, so that now the film-transport motor 101 is connected for rewind.

During this A4 program step of counter 165, and during the subsequent A5 and A6 program steps thereof, transistors 102 and 105 are kept conductive for film rewind. Also transistor 133 is maintained non-conductive, via gate 170.

When program counter 165 converts to its A7 state, transistors 103 and 104 become biased for conduction by means of gate 168, so that the film-transport motor 101 is again connected for forward film transport. Additionally, via gates 171 and 178, transistor 177 is rendered non-conductive. Also, gate 172 receives a "1" signal readying it for response to closing of the release switch 176.

When transistor 177 goes non-conductive, relay 107 becomes deenergized, and contact 106 opens, interrupting the current path for film-transport motor 101. Because transistor 133 is still non-conductive, the aperture of diaphragm 126 remains stepped down by the number of aperture-setting steps by which it had already been brought down. I.e., if the scene light level changes, the negative-feedback diaphragm control system can respond appropriately, but because fadeover resistor 118 is still connected in the light-sensitive bridge 116–120, the system continues to be in a state awaiting the commencement of a fade-in.

This program step A7 of program-step counter 165 is the "waiting" program step. I.e., a fade-out and rewind have been completed, and the camera is in readiness for the user to commence filming of the next scene, the scene to be faded-in. If the user should inadvertently change the fadeover duration selected by means of potentiometer 141, this will have no effect upon the not yet completed fadeover operation.

It should be noted that during "waiting" program step A7 of counter 165, frame-pulse counter 147 does not perform a counting cycle, because film is not being transported and accordingly frame pulses are not being generated.

When the user is ready to commence filming of the next scene, the scene to be faded-in, he closes release switch 176. This energizes relay 107 and accordingly closes contact 106. Motor 101, connected for forward film transport, now receives current and effects forward film transport. Via gate 172, a "1" signal is applied to the input of gate 167. As a result, a "1" signal is applied to the C-input of program-step counter 165, and the latter converts from its "waiting" state A7 to its state A8. The "1" to "0" transition at output A7 of program counter 165 causes gate 170 to render transistor 133 conductive and short-circuit fadeover resistor 118. Accordingly, the fade-in commences. Transistor 130 is kept conductive by gates 238 and 239, so that the base frequency for the control oscillator will be at its upper elevated value, for the first of the three phases of the fade-in operation.

After frame-pulse counter 147 has completed its counting cycle during this program step A8, the program-step counter 165 is advanced to its A9 state. The A9 program step is the second phase of the fade-in operation. By means of gate 236 transistor 230, instead of transistor 130, becomes conductive, so that for the second phase of the fade-in operation the base frequency of stepper-motor energizing pulses will have its middle elevated value, and the adjustment speed of the stepper motor will be correspondingly lowered.

After frame-pulse counter 147 has completed its counting cycle during this program step A9, the program-step counter 165 is advanced to its A10 state. By means of gate 234, transistor 232, instead of transistor 232, becomes conductive, and the adjusting speed of the stepper motor is decreased again, i.e., because the base frequency of the stepper-motor energizing pulses will now have been decreased to the lower elevated value.

When frame-pulse counter 147 has completed its counting cycle during this program step A10, the program-step counter 165 returns to its normal state A0. The actual fade-in operation is now finished. Transistor 177 becomes non-conductive, so that continuation of filming will occur only so long as release switch 176 continues to be held closed; if the photographer has already let go of release switch 176, filming will cease. Furthermore, with counter 165 now back in its A0 state, a "0" signal appears at the output of inverter 152. This disables gates 196, 160, 198 and 150. Counters 147 and 148 are erased, via gate 160. Furthermore, the "fade-over" command signal registered by JK flip-flop 157 is erased. Also, counter 149 is reset, via gate 196. Gate 153 is disabled by flip-flop 157, because the latter is in its normal state. Additionally, transistor 232 is rendered non-conductive via gate 234, so that the base frequency for stepper-motor energizing pulses will again be determined by resistors 128, 129 and capacitor 172 alone. I.e., the base frequency is returned to its normal value, for normal filming.

A few words should be said about the stepper-motor control circuit 122, and about the relationships among the various frequencies and pulse duty factors in the illustrated circuit.

Stepper-motor control circuit 122 has two inputs, one for receipt of a control signal indicating that the diaphragm aperture should be increased, the other for receipt of a control signal indicating that the diaphragm aperture should be decreased. These aperture-increase and aperture-decrease control signals are furnished by comparator amplifier 121. Comparator amplifier 121 produces an aperture-increase signal if the light-sensitive bridge circuit is imbalanced in a first sense, in excess of a certain minimum amount; likewise, 121 produces an aperture-decrease signal if the light-sensitive bridge circuit is imbalanced in the opposite sense, in excess of a certain minimum amount. If the bridge circuit is only slightly imbalanced, then no aperture-increase or aperture-decrease control signal is furnished; i.e., a dead zone is deliberately established, to prevent hunting.

The stepper-motor control circuit conventionally includes a forward-backward ring counter, each output of which is connected to one of the four stator windings of stepper motor 123. Each time the ring counter receives an input pulse, a different one of the four stator windings becomes energized, producing rotation of the stepper-motor rotor. Conventionally, the forward-backward ring counter has a forward-counting control input and a backward-counting control input. When a control signal is applied to the forward-counting control input, then the input pulses applied to the ring counter cause the counter to count in a first direction, resulting in forward motor operation. When a control signal is applied to the backward-counting control input, then the input pulses applied to the ring counter cause the counter to count in the opposite direction, resulting in reverse motor operation. The forward-counting and backward-counting control inputs of the ring counter are connected to respective ones of the two outputs of the comparator amplifier 121.

The pulses actually applied to the input of the ring counter, i.e., the pulses to be counted, are produced by the aforementioned oscillator internal to stepper-motor control circuit 122. This oscillator is, for example, an astable multivibrator, provided with resistors and capacitors which establish the time-constant for the ON-state of the multivibrator and the time-constant for the OFF-state of the multivibrator, and thereby the durations of the ON- and OFF-states thereof. The externally depicted time-constant elements 127–129 (and 131 or 231 or 233) determine the time-constant for one state of the oscillator.

It will be understood that each of the elements described above, or two or more together, may also find a useful application in other types of circuits and construction differing from the types described above.

While the invention has been illustrated and described as embodied in a motion-picture camera capable of producing fade-in, fade-out and fadeover effects, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of piror art, fairly constitute esential characteristics of the generic or specific aspects of this invention.

What is claimed as new and desired to be portected by Letters Patent is set forth in the appended claims.

1. In a motion-picture camera of the type including a film transport motor, an adjustable diaphragm, and light-sensitive negative-feedback diaphragm control means operative for adjusting the diaphragm setting in dependence upon scene light, including a stepper motor coupled to the diaphragm, and a control circuit operative for operating the stepper motor by generating stepper-motor drive pulses and including components forming a time-constant circuit operative for establishing the repetition frequency of the stepper-motor drive pulses, a novel arrangement for producing fadeover effects, the arrangement comprising, in combination, means for establising $m$ different repetition frequencies for the stepper-motor drive pulses, the first through the $m$th frequencies being successively higher, including $m$ semiconductor switches each connected to the time-constant circuit for changing the time-constant thereof; program-step counting means operative for receiving program-step-change signals and counting in dependence thereon, the program-step counting means being a 1-out-of-$n$ binary counter having $n$ outputs of which successive single ones carry a signal in response to successively received program-step-change signals, the $n$ outputs including first, second and third output groups respectively constituting a fade-out output group, a rewind output group and a fade-in output group, the number of outputs in each group being equal to $m$; means for applying program-step-change signals to the input of the program-step counting means in dependence upon film transport effected by the film transport motor; logic circuit means connected to the outputs of the program-step counting means, connected to the negative-feedback diaphragm control means and connected to the film transport motor and operative in dependence upon the count registered on the program-step counting means for effecting a fade-out followed by a limited film rewind followed by a fade-in, by imbalancing the negative-feedback diaphragm control means and controlling the operation of the film transport motor; and connecting means connecting respective ones of the first through the $m$th semiconductor switches to respective ones of the first through the $m$th outputs of the fade-out output group, and connecting respective ones of the first through the $m$th semiconductor switches to respective ones of the $m$th through the first outputs of the fade-in output group, for controlling the conduction of the switches in dependence upon the signals carried on the outputs of the fade-out and fade-in output groups and causing the repetition frequency of the stepper motor drive pulses to increase during the course of a fade-out and decrease during the course of the subsequent fade-in.

2. In a motion-picture camera as defined in claim 1, the components forming the time-constant circuit including a time-constant resistor, the means for establishing the $m$ frequencies furthermore including $m$ further resistors, each of the $m$ switches being connected in series with a respective one of the $m$ further resistors across the time-constant resistor.

3. In a motion-picture camera as defined in claim 1, the means for applying program-step-change signals comprising pulse-generating means for generating a pulse train, gating means receiving the pulse train and transmitting the pulses thereof during the throughpass time interval thereof to produce a reference pulse packet, selecting means operable by the photographer for selecting the number of frames to be involved in a fadeover indirectly by selecting the throughpass time interval and thereby the number of pulses in the reference pulse packet, means for generating frame pulses indicative of the number of transported film frames, first counting means connected to receive the frame pulses and operative for counting in dependence thereon, second counting means, comparator means connected to the first and second counting means for generating a program-step-change signal and applying the latter to the program-step counting means when the counts on the first and second counting means are the same, means operative for initiating a sequence of program steps including means for causing the second counting means to register the number of pulses in the reference pulse packet, means operative in response to the program-step-change signal produced at the end of a program step for resetting the first counting means for performance of another counting cycle for the next program step, an electronic switch connected in the current path of the time-constant circuit, and compensating means operative for causing the amount of diaphragm aperture change effected by the stepper motor during the fade-out and during the fade-in to be always the same irrespective of the number of pulses in the reference pulse packet and therefore irrespective of the number of film frames involved in the fadeover by repeatedly rendering the electronic switch conductive for conduction-time time intervals inversely related to the number of pulses in the reference pulse packet.

4. In a motion-picture camera as defined in claim 3, the compensating means comprising third counting means connected to receive the pulse train from the pulse-generating means for counting in dependence thereon, comparator means connected to the second and third counting means for furnishing a switch-control signal when the counts on the second and third counting means are the same, and means operative in dependence upon the switch-control signal for changing the conduction state of the electronic switch and readying the third counting means for performance of another counting cycle.

5. In a motion-picture camera as defined in claim 4, the $n$ outputs of the program-step counting means including a program-unstarted output preceding the fade-out output group and a waiting-step output preceding the fade-in output group, the logic circuit means including means operative in response to the absence of a signal on the program-unstarted output for enabling the first counting means to count in dependence upon frame pulses and enabling the electronic switch to become responsive to switch-control signals, first OR-gate means having inputs connected to the outputs of the fade-out output group, to the waiting-step output and to the outputs of the fade-in output group and means connected to the output of the first OR-gate means operative for connecting the film transport motor for forward film transport, and second OR-gate means having inputs connected to the outputs of the fade-out output group, the outputs of the rewind output group and the waiting-step output and means connected to the output of the second OR-gate means operative for imbalancing the diaphragm control means in a sense producing a diaphragm aperture decrease for fade-out.

6. In a motion-picture camera as defined in claim 3, the pulse-generating means constituting first pulse generating means for generating a first pulse train; the gating means including second pulse-generating means operative for generating a second pulse train whose pulse-repetition frequency is lower than that of the first pulse train by a factor equal to at least the maximum number of pulse countable by the second counting means, the pulses of the second pulse train each lasting for a pulse time interval constituting the throughpass time interval, the means for initiating a sequence of program steps including a fadeover switch operable by the user for commanding a fadeover operation, a first bistable storage device connected to the fadeover switch and operative in response thereto for storing a fadeover command for the entire duration of a fadeover operation, means connected to the first bistable storage device and operative in response to storage of a fadeover command for causing the first counting means to become responsive to frame pulses, a second bistable storage device having a first-state input and a second-state input and a clock-signal input, means connected to the second counting means and to the first-state input of the second bistable storage device for applying a signal thereto in response to commencement of counting by the second counting means, means connecting the second pulse-generating means to the second-state input of the second bistable storage device for applying signals thereto in dependence upon the pulses generated by the second pulse-generating means, means connecting the first pulse-generating means to the clock-signal input of the second bistable storage device for applying signals thereto in dependence upon the pulses generated by the first pulse-generating means, the means for causing the second counting means to register the pulses of the reference pulse packet comprising means operative for transmitting pulses from the gating means to the second counting means when the second bistable storage device is in a predetermined one of its states.

7. In a motion-picture camera as defined in claim 6, the compensating means comprising means operative for rendering the electronic switch conductive and non-conductive with a frequency equal to the repetition frequency of the second pulse train.

8. In a motion-picture camera as defined in claim 6, said means for applying a signal to the first-state input of the second bistable storage device in response to commencement of counting by the second counting means including a NOR-gate having inputs connected to the outputs of the second counting means, and a further gate having one input connected to the output of the NOR-gate and having another input connected to receive frame pulses and having an output connected to the first-state input of the second bistable storage device, the output of said further gate being furthermore connected to the input of the program-step counting means for furnishing thereto a pulse when the second counting means begins to count, the logic circuit means including means operative for detecting when the program-step counting means is in the process of counting and generating a program-in-process signal indicating that the program-step counting means is counting, the means for initiating a sequence of program steps including a NOR-gate connected to receive the fadeover command signal and the program-in-process signal and when in receipt of either of the latter operative for enabling the first counting means for operation.

9. In a motion-picture camera as defined in claim 8, said further gate being connected to the input of the program-step counting means through the intermediary of a differentiator and an OR-gate, the OR-gate having an input connected to the output of the comparator means.

10. In a motion-picture camera as defined in claim 4, the electronic switch having a control electrode, further including an AND-gate having an output connected to the control electrode and having two inputs, means connected to the program-step counting means operative for generating a program-in-process signal when the program-step counting means is counting and applying the program-in-process signal to one input of the AND-gate, the other input of the AND-gate being connected to the output of the comparator means connected to the second and third counting means, the logic circuit means including a further gate whose output is connected to the reset input of the third counting means, one input of the further gate being connected to receive the program-in-process signal, an inverter and a differentiator connecting the second pulse-generating means to the other input of the further gate, the third counting means having a counting-arrest input connected to receive the switch-control signal.

* * * * *